United States Patent
Cote et al.

(10) Patent No.: US 11,952,109 B2
(45) Date of Patent: Apr. 9, 2024

(54) METHOD AND SYSTEM FOR ASSISTING WITH PILOTING AN AIRCRAFT AND AIRCRAFT

(71) Applicants: Airbus SAS, Blagnac (FR); Airbus Operations SAS, Toulouse (FR)

(72) Inventors: Stéphane Cote, Blagnac (FR); Christine Gris, Toulouse (FR); Philippe Castaigns, Blagnac (FR); Cesar Garcia Castilla, Blagnac (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 189 days.

(21) Appl. No.: 17/725,597

(22) Filed: Apr. 21, 2022

(65) Prior Publication Data
US 2022/0340268 A1    Oct. 27, 2022

(30) Foreign Application Priority Data
Apr. 26, 2021 (FR) ...................................... 2104283

(51) Int. Cl.
*B64C 25/28* (2006.01)
(52) U.S. Cl.
CPC .................... *B64C 25/28* (2013.01)
(58) Field of Classification Search
CPC ...................................................... B64C 25/28
See application file for complete search history.

(56) References Cited

U.S. PATENT DOCUMENTS

| | | | |
|---|---|---|---|
| 4,034,334 A * | 7/1977 | Allyn | G01M 1/125 244/76 R |
| 4,951,047 A | 8/1990 | Paterson et al. | |
| 6,854,689 B1 | 2/2005 | Lindahl et al. | |
| 10,696,418 B2 | 6/2020 | Pena et al. | |
| 11,531,356 B2 * | 12/2022 | Wilson | B64D 45/04 |
| 11,608,160 B2 * | 3/2023 | L'Allier | B64C 25/20 |
| 11,753,151 B2 * | 9/2023 | Marles | B64C 25/26 244/102 R |

(Continued)

FOREIGN PATENT DOCUMENTS

| | | |
|---|---|---|
| DE | 29721884 U1 | 5/1998 |
| EP | 3725678 A1 | 10/2020 |
| GB | 2139587 A | 11/1984 |

*Primary Examiner* — Travis R Hunnings
(74) *Attorney, Agent, or Firm* — Greer. Burns, & Crain, Ltd.

(57) ABSTRACT

A system for an aircraft comprising a controller configured to obtain a first piece of information regarding whether the aircraft has achieved lift-off; to obtain a second piece of information regarding whether the aircraft is in a flight phase in an initial part of lift-off; to determine, on the basis of at least the first piece of information whether the gear is retractable, and, if the gear is retractable in an initial part of the lift-off, to trigger a landing-gear-retraction alarm taking an audio form and/or a visual form, and, if the gear is retractable after the initial part of the lift-off to optionally trigger a second landing-gear-retraction alarm taking an audio form and/or a visual form. A method implemented by the system is provided. Advantageously, an omission of the retraction of the landing gear of an aircraft is notified to its flight crew.

13 Claims, 4 Drawing Sheets

(56) References Cited

U.S. PATENT DOCUMENTS

| | | | |
|---|---|---|---|
| 2015/0122945 A1* | 5/2015 | Kavounas | B64C 25/30 |
| | | | 244/102 R |
| 2020/0264635 A1* | 8/2020 | Wilson | G05D 1/0676 |
| 2020/0277043 A1* | 9/2020 | Kerr | B64C 25/16 |
| 2020/0331587 A1 | 10/2020 | L'Allier | |
| 2022/0340269 A1* | 10/2022 | Izquierdo Civera | B64C 25/28 |
| 2023/0382519 A1* | 11/2023 | Lappos | B64D 45/04 |

* cited by examiner

METHOD AND SYSTEM FOR ASSISTING WITH PILOTING AN AIRCRAFT AND AIRCRAFT

CROSS-REFERENCES TO RELATED APPLICATIONS

This application claims the benefit of the French patent application No. 2104283 filed on Apr. 26, 2021, the entire disclosures of which are incorporated herein by way of reference.

FIELD OF THE INVENTION

The present invention relates to a method and system for assisting with piloting an aircraft during a lift-off procedure. The invention more particularly relates to a method and system for generating alarms relative to an abnormally still deployed configuration of a landing gear.

BACKGROUND OF THE INVENTION

The aircraft operating procedures are conventionally standardized. Thus, for example, a little after the lift-off of an aircraft provided with a retractable landing gear, one of the members of the flight crew of the aircraft makes an announcement with a view to indicating to the other member of the flight crew that a satisfactory climb rate is observed by saying out loud the words "positive climb". The observation of a satisfactory climb rate is generally based on observed lift-off conditions determined by looking through a window of the cockpit, by reading an indication of an altimeter, or even by reading an indication of a variometer. According to this procedure, the other member of the flight crew responds to this announcement by saying, again out loud, the words "gear up", or expressed in other terms that retraction of the landing gear of the aircraft is requested and expected presently. The crew member who made the first announcement then effects the maneuver of retraction of the landing gear by acting on a control provided to this end and available in the cockpit of the aircraft, for example on the instrument panel. This member of the flight crew lastly announces the retraction of the landing gear by repeating the words "gear up" out loud. The landing gear is then retracted into housings in the aircraft provided for this purpose. This procedure of retraction of the landing gear is most often initiated about three seconds after lift-off in the strict sense of the term, i.e., three seconds after the wheels of the aircraft have left contact with the surface of the runway. Lift-off is one of the flight phases that places the most demands on the flight crew since many actions, especially piloting actions, control actions, and monitoring actions, are carried out during this flight phase. The resultant flight-crew workload is high and may possibly be increased in case of incident, such as for example the occurrence of a malfunction of an engine of the aircraft, or of any alarm. In such a situation, the normal sequencing of operations to be executed may be interrupted, and hence the procedure of retraction of the landing gear may not occur at the expected time and the landing gear may thus remain in lowered position (gear out). This flight configuration, which generates additional drag, degrades the flight performance of the aircraft, in particular immediately after lift-off when the speed of the aircraft is relatively low, but also at cruising speed when an overconsumption of fuel results from the additional drag generated by the lowered position of the landing gear. The overconsumption of fuel then induced may be sufficiently high to compromise the execution of the flight to the intended destination. Furthermore, flying an aircraft with its landing gear in lowered position generates vibrations that are liable to be wrongly interpreted as vibrations originating from an engine, this possibly leading, in extreme cases, to inappropriate stoppage of an engine.

The situation may therefore be improved.

SUMMARY OF THE INVENTION

The present invention especially aims to mitigate an omission of the procedure of retraction of the landing gear after lift-off of an aircraft. To this end, a system is provided for assisting with piloting an aircraft equipped with a retractable landing gear, the system comprising a controller device configured to:
- obtain a first piece of information regarding whether the aircraft has achieved lift-off,
- obtain a second piece of information regarding whether the aircraft is in a flight phase in an initial part of lift-off,
- determine, on the basis of at least the first piece of information, whether the landing gear is retractable,
- if the landing gear is retractable in the initial part of lift-off, triggering a first landing-gear-retraction alarm taking an audio form and/or a visual form, and,
- if the landing gear is retractable after the initial part of the lift-off, triggering a second landing-gear-retraction alarm taking an audio form and/or a visual form, the second landing-gear-retraction alarm being different from the first landing-gear-retraction alarm.

The piloting-assisting system advantageously allows the flight crew to be notified of an omission of the retraction of the landing gear in case of a disturbance before or during a standard procedure in the initial part (or phase) of lift-off. The fact that the first and second landing-gear-retraction alarms are different advantageously makes it possible to notify the flight crew in two different ways of an omission of the retraction of the landing gear, and therefore to mitigate the fact that one of the alarms has not been correctly perceived by the flight crew, especially in case of disturbance before or during a standard procedure in the initial part (or phase) of lift-off. Thus, flight safety is enhanced.

The piloting-assisting system according to the invention may also comprise the following features, considered individually or in combination:
- The second landing-gear-retraction alarm is different from the first landing-gear-retraction alarm.
- Each of the first and second pieces of information is determined on the basis of at least one or on the basis of a plurality of pieces of information representative of conditions from the list:
  - a predefined position of a lever for controlling retraction of the landing gear,
  - a predefined position of the landing gear,
  - a climb rate higher than a predefined climb-rate threshold value,
  - a climb rate higher than a predefined climb-rate threshold value for a predetermined climb time,
  - an air speed higher than a predefined air-speed threshold value,
  - a flight phase for a minimum predefined flight time,
  - an altitude or a flight level higher than a predefined altitude or flight-level value,
  - a variation in a reference speed of an engine greater than a predefined threshold value in the course of a predetermined period, a presence of a condition indicating that a lowered position of the landing gear is preferable, a position of leading-edge slats, a position of flaps, a determination of one flight phase among a plurality of predefined flight phases, an exceedance of a maximum flight speed in flight configuration with a landing gear deployed.

The controller device is further configured to determine a third piece of information regarding whether the landing gear is in a non-retractable configuration, and is configured to inhibit the trigger of a retraction alarm or to interrupt a retraction alarm in progress.

The third piece of information is determined on the basis of at least one or on the basis of a plurality of pieces of information representative of conditions from the list:

a landing-gear-retraction fault has occurred, a negative or insufficient climb rate is determined during the initial part of the lift-off, an element of the landing gear has an excessive temperature.

The controller device is configured to trigger an alarm inviting a flight crew to keep the landing gear deployed.

The controller device is configured, if the landing gear is retractable in the initial part of lift-off, after a first predetermined delay starting from the trigger of the first landing-gear-retraction alarm, to trigger the first landing-gear-retraction alarm again.

The controller device is configured, if the landing gear is retractable after the initial part of the lift-off, after a second predetermined delay starting from the trigger of the second landing-gear-retraction alarm, to trigger the second landing-gear-retraction alarm again.

Another subject of the invention is an aircraft comprising a piloting-assisting system such as described above.

Another subject of the invention is a method for assisting with piloting an aircraft equipped with a retractable landing gear, the method being executed in a controller of an aircraft system of said aircraft, the method comprising:

obtaining a first piece of information regarding whether the aircraft has achieved lift-off, obtaining a second piece of information regarding whether the aircraft is in a flight phase in an initial part of lift-off, determining, on the basis of at least the first piece of information, whether the landing gear is retractable, if the landing gear is retractable in the initial part of lift-off, triggering a first landing-gear-retraction alarm taking an audio form and/or a visual form, and if the landing gear is retractable after said initial part of the lift-off, the controller device of the piloting-assisting system triggers a second landing-gear-retraction alarm taking an audio form and/or a visual form, the second landing-gear-retraction alarm being different from the first landing-gear-retraction alarm.

According to one embodiment, the method further comprises a step in which the controller device of the piloting-assisting system determines a third piece of information indicating whether the landing gear is in a non-retractable configuration, and inhibits the trigger of a retraction alarm or interrupts a retraction alarm in progress.

According to one embodiment, the method further comprises a step in which the controller device of the piloting-assisting system triggers an alarm inviting a flight crew to keep the landing gear deployed.

According to one embodiment, the method further comprises a step in which, if the landing gear is retractable in the initial part of lift-off, after a first predetermined delay starting from the trigger of the first landing-gear-retraction alarm, the controller device of the piloting-assisting system triggers the first landing-gear-retraction alarm again.

According to one embodiment, the method further comprises a step in which, if the landing gear is retractable after said initial part of the lift-off, after a second predetermined delay starting from the trigger of the second landing-gear-retraction alarm, the controller device of the piloting-assisting system triggers the second landing-gear-retraction alarm again.

Lastly, a final subject of the invention is a computer program product comprising program code instructions for executing the steps of the method described above when the program is executed by a processor, and a data storage medium comprising such a product computer program product.

BRIEF DESCRIPTION OF THE DRAWINGS

The features of the invention that were mentioned above, along with others, will become more clearly apparent on reading the following description of at least one example of embodiment, said description being given with reference to the appended drawings, in which.

DETAILED DESCRIPTION OF THE PREFERRED EMBODIMENTS

Figure 1:
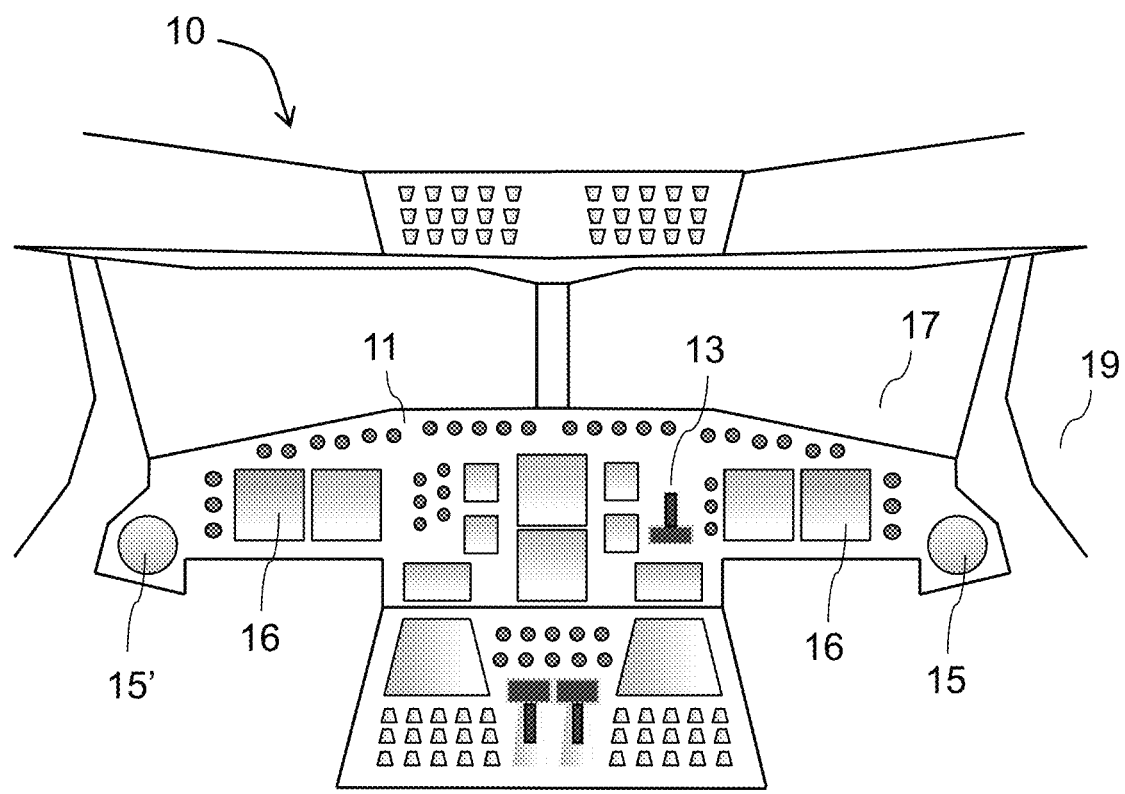
FIG. 1 schematically illustrates a cockpit of an aircraft.

FIG. 1 schematically shows a cockpit 10 of an aircraft 1, for example of medium-haul category. The aircraft 1 may be of short-, medium- or long-haul category. The cockpit 10 especially comprises an instrument panel 11, and windows 17 and 19 allowing the environment outside the aircraft 1 to be seen. The instrument panel 11 comprises a multitude of rendering and control devices. Together, these devices form a human-machine interface between the flight crew, who are qualified to pilot the aircraft 1, and the aircraft 1. The control devices allow the avionic systems of the aircraft 1 to be configured. The rendering devices allow the pilots to be provided with information on the configuration of the aircraft 1 and information useful to the progress of the various flight phases to be delivered thereto. For example, the instrument panel 11 comprises two audio rendering devices 15 and 15' that are configured to emit messages or audio alarms taking the form of rendered voices or sounds. According to one embodiment, the audio rendering devices 15 and 15' are loudspeakers. The instrument panel 11 also comprises visual rendering devices 16 that are configured to emit visual alarms or messages, for example taking the form of writing (text), of an indicator light, of a modification of the ambient lighting of the cockpit, or of a variation in the color of a back-light of a device. The instrument panel 11, and more broadly the equipment of the cockpit, may be divided into a plurality of avionic modules. A landing-gear-control lever 13, arranged on the instrument panel 11, is configured to allow the flight crew of the aircraft 1 to control the deployment and retraction of the landing gear of the aircraft 1. According to one embodiment of the invention, when the control lever 13 is positioned in up position on the instrument panel 11, this causes the landing gear to be retracted and kept in its retracted position. In contrast, when the control lever 13 is positioned in down position on the instrument panel 11, this causes the landing gear to be deployed and kept in its deployed position. The deployed position of the landing gear is also commonly called the lowered configuration of the landing gear or even the "gear out" configuration. Sensors are used to determine the position of the landing gear. According to one embodiment, a retraction of the landing gear is effected by virtue of systems provided and configured for this purpose, and comprising actuators and sensors.

According to one embodiment, the aircraft 1 comprises a piloting-assisting system 400 (not shown in FIG. 1 but visible in FIG. 5) comprising a controller device 100 (shown in FIG. 4) that is configured to trigger one or more landing-gear-retraction alarms, if the landing gear is not retracted during the standard operating procedure involving exchanges between two members of the flight crew of the aircraft, one of the members of the flight crew, for example mainly being assigned piloting tasks, and the other of the members of the flight crew, for example mainly being assigned controlling and monitoring tasks.

According to one embodiment, the controller device 100 of the system 400 for assisting with piloting the aircraft 1 is configured to obtain many pieces of information representative of operating conditions of the aircraft, and therefore possibly pieces of information representative of flight phases or of flight conditions. These pieces of information are obtained on the basis of electrical or electronic signals originating from sensors and/or originating from avionic modules dedicated to monitoring or control operations of the systems of the aircraft 1.

Thus, the controller device 100 is able to obtain, for example, a piece of information regarding whether the aircraft has achieved lift-off. This piece of information may be obtained on the basis of various other pieces of information, taking the form of data and/or of signals, considered alone or in combination. For example, the piece of information regarding whether lift-off has been achieved may be determined on the basis of a piece of information regarding positive climb rate, which piece of information is measured during a period of predefined duration of a plurality of seconds or even of a plurality of tens of seconds, without detection over the same period of a negative climb rate. According to another example, lift-off may be detected as a result of a positive climb rate being detected for a far longer period of time than a period of time during which a negative climb rate is detected, in the course of the same reference period following an increase in the operating speed of the engines of the aircraft. According to yet another example, lift-off may be detected on the basis of one or more inertial measurement units (or IMUs), configured to deliver signals representative of the movements of the aircraft 1, and, in particular, to estimate its orientation about roll, pitch and yaw axes, with respect to an estimation regarding the start point of the aircraft 1.

According to one embodiment of the invention, lift-off is detected on the basis of a combination of pieces of information regarding climb rate and the air speed of the aircraft 1.

These examples are obviously non-limiting, and more generally, the information regarding whether lift-off has been achieved may be determined on the basis of one or more signals or of one or more pieces of data representative of operating conditions of the aircraft 1, such conditions including:

- an up or down position of the landing-gear-retraction-control lever 13,
- a position of the landing gear indicating that the landing gear is detected to be in deployed position,
- a climb rate higher than a predefined climb-rate threshold value, and, for example, a vertical speed of the aircraft higher than 100 feet per minute,
- a climb rate higher than a predefined climb-rate threshold value for a predetermined climb time, and, for example, a vertical speed kept above 100 feet per minute for more than 5 seconds or more than 10 seconds,
- an air speed higher than a predefined air-speed threshold value, and, for example, an airspeed higher by more than 10% than the speed of rotation of the aircraft at which the crew initiates a nose-up trim (position) of the aircraft 1 following an acceleration on the runway,
- a flight phase having lasted a predefined minimum flight time, and, for example, a piece of information representative of the fact that an initial phase of lift-off is in the process of being executed, which piece of information is delivered by an avionic module dedicated to that purpose, or even a piece of information representative of the fact that a flight phase that comes after an initial lift-off phase is in the process of being executed, which piece of information is delivered by an avionic module dedicated to that purpose,
- an altitude or flight level higher than a predefined altitude or flight-level value obtained from an altimeter module (such as the radar altimeter), and, for example, an altitude higher than 100 feet, or an altitude higher than 500 feet,
- a variation in the reference speed of an engine larger than a predefined threshold value in the course of a predetermined period, such as, for example, a very substantial increase in the operating speed of each of the engines, with regard to a reference maximum speed or a predefined reference cruise speed,
- a presence of a condition indicating that a lowered position of the landing gear is preferable, and, for example, a presence of an alarm indicating a problem with an increase in the power of the operating regime of an engine from a low or minimal regime,
- a position of leading-edge slats, the slats being extended (out) or retracted,
- a position of flaps, the flaps being extended (out), or retracted,
- a determination of a flight phase among a plurality of predefined flight phases, on the basis of one or more avionic modules dedicated to automatically determining a flight phase among a plurality of predefined flight phases (for example with respect to a list of parameters compared to a lookup table (LUT)),
- an exceedance of a maximum flight speed in a flight configuration with a deployed landing gear, such a maximum flight speed being determined by the manufacturer of the aircraft 1.

The obtained information regarding whether lift-off has been achieved corresponds to detection of lift-off in the strict sense of the term, i.e., the moment at which all of the wheels of the aircraft have left all contact with the ground of the runway.

Thus, the term lift-off must be interpreted in the present description not only as lift-off in the strict sense of the term, which indicates the moment when the aircraft adopts a nose-up trim with a view to leaving the runway, but also then as the flight phase following lift-off in the strict sense of the term and during which the aircraft will reach its cruising route and will be configured into its cruising configuration in which it will remain until it starts to descend toward the infrastructure of the destination airport. In the following description, lift-off, when it is interpreted not in the strict sense of the term lift-off but as a flight phase, may be divided into two distinct portions, i.e., two distinct lift-off phases, denoted the initial part (or phase) of the lift-off and the part (or phase) that comes after the initial part of the lift-off, respectively.

According to one embodiment of the invention, the initial part of the lift-off ends when the aircraft 1 reaches a predefined altitude or a predefined flight level, for example 5000 feet or 6000 feet. According to one variant, the initial part of the lift-off ends when the aircraft 1 achieves a predefined transition altitude, which is determined by an avionic module of the aircraft 1. According to yet another variant, the initial phase of the lift-off ends when one or more elements of the aircraft 1 are configured by the flight crew into a configuration different from a configuration specific to the lift-off of the aircraft 1, and, for example, when the flaps are retracted, especially allowing drag to be decreased and the airspeed of the aircraft to be increased.

More broadly, a plurality of elements such as the flight conditions and/or configuration conditions of the aircraft may be defined to determine at which moment the initial part of the lift-off of the aircraft 1 ends with a view to then entering a flight phase that comes after this initial part of the lift-off. It will be noted that if the aircraft is not in a flight phase in the initial part of the lift-off, it is here considered that it is then, thus, in a flight phase that comes after the initial part of the lift-off (or that is subsequent to the initial part of the lift-off).

According to one embodiment, the controller device 100 of the piloting-assisting system 400 is configured to obtain a piece of information regarding whether the aircraft 1 is or is not in a flight phase in an initial part of lift-off, i.e., an initial part such as defined above.

Similarly to the determination of a first piece of information regarding whether lift-off has been achieved, this second piece of information, which aims to define whether the aircraft is or is not in a flight phase in the initial part of the lift-off, may be obtained on the basis of various other pieces of information, taking the form of data and/or signals, considered alone or in combination. For example, the piece of information regarding whether the aircraft 1 is or is not in a flight phase comprised in the initial part of the lift-off may be determined on the basis of a piece of information regarding positive climb rate, measured during a period of predefined duration of a plurality of seconds or even of a plurality of tens of seconds, without detection over the same period of a negative climb rate. According to one embodiment of the invention, the initial part of the lift-off is detected on the basis of a combination of pieces of information regarding climb rate and the air speed of the aircraft.

Once again, these examples are non-limiting, and more generally, the information regarding whether the flight is or is not in the initial part of the lift-off may be determined on the basis of one or more signals or of one or more pieces of data representative of operating conditions of the aircraft 1, such conditions including:

an up or down position of the landing-gear-retraction-control lever 13, a position of the landing gear indicating that the landing gear is detected to be in deployed position, a climb rate higher than a predefined climb-rate threshold value, and for example a vertical speed of the aircraft higher than 100 feet per minute, a climb rate higher than a predefined climb-rate threshold value for a predetermined climb time, and, for example, a vertical speed kept above 100 feet per minute for more than 10 seconds or more than 20 seconds, an air speed higher than a predefined air-speed threshold value, and, for example, an air speed corresponding to an initial climb speed, in flap-extended configuration, a flight phase having lasted a predefined minimum flight time, and, for example, a piece of information representative of the fact that an initial phase of lift-off is in the process of being executed, which piece of information is delivered by an avionic module dedicated to that purpose, or even a piece of information representative of the fact that a flight phase that comes after an initial lift-off phase is in the process of being executed, which piece of information is delivered by an avionic module dedicated to that purpose, an altitude or flight level higher than a predefined altitude or flight-level value, which altitude or flight level is obtained from an altimeter module (such as the radar altimeter), and for example an altitude higher than 100 feet, or an altitude higher than 500 feet, and lower than a transition level, a reference speed of an engine in a range of predefined values, a presence of a condition indicating that a lowered position of the landing gear is preferable, and, for example, a presence of an alarm indicating a problem with an increase in the power of the operating regime of an engine from a low or minimal regime, a position of leading-edge slats, the slats being extended (out) or retracted, a position of flaps, the flaps being extended (out), or retracted, a determination of a flight phase among a plurality of predefined flight phases, on the basis of one or more avionic modules dedicated to automatically determining a flight phase among a plurality of predefined flight phases (for example with respect to a list of parameters compared to a lookup table (LUT)), an exceedance of a maximum flight speed in the flight configuration with landing gear deployed, such a maximum flight speed being determined by the manufacturer of the aircraft 1.

The control device 100 of the piloting-assisting system 400 is further configured to determine, on the basis of at least the first piece of information indicating that lift-off has been achieved, that the landing gear is retractable. Whether the landing gear is retractable may also be determined on the basis of one or more other pieces of information or data representative of flight conditions, or of configuration conditions of the aircraft 1, among which mention may be made of a down position of the landing-gear-control lever 13, a detection of the deployed position of the landing gear, an air speed, an altitude or a flight level, an indication of engine speed, an absence of fault, incident or malfunction during the lift-off, one example of such a fault, incident or malfunction being an inability to retract the landing gear, these examples being non-limiting.

Thus, advantageously, the controller 100 of the piloting-assisting system 400 of the aircraft 1 is able to detect an omission of execution of a standard landing-gear-retraction procedure comprising successively an announcement "positive climb" by a first member of the flight crew who has verified that the conditions of retraction of the landing gear have been met, an announcement "gear up" by another member of the flight crew, inviting the landing gear to be retracted presently, and lastly an announcement "gear up" by the first member of the flight crew, who will have positioned the landing-gear-retraction control lever 13 in response to the aforementioned first announcement "gear up".

Cleverly, the controller 100 of the piloting-assisting system 400 of the aircraft 1 having detected an omission of execution of the aforementioned standard procedure, during the initial part of the lift-off, may trigger a first landing-gear-retraction alarm taking an audio and/or visual form.

For example, the controller 100 may trigger a first landing-gear-retraction alarm taking the form of a synthesized voice rendering a predetermined message. One non-limiting example of a predetermined message reproduces the terms "positive climb" so as to mitigate an omission of the initially planned retraction procedure. The announcement is then made by way of the audio rendering devices 15 and 15' of the instrument panel 11 of the cockpit 10 of the aircraft 1. Advantageously, such an announcement is not systematic and is triggered only in case of omission of the initially planned standard procedure.

According to another example, the controller 100 may trigger the first landing-gear-retraction alarm taking the form of writing conveying a predetermined message, or taking the form of an indicator light, or taking the form of a modification of the ambient lighting of the cockpit 10, or even taking the form of a variation in the color of a back-light of a device of the instrument panel 11 of the cockpit 10. The message is displayed or made visible to the flight crew by way of a visual rendering device 16 of the instrument panel 11 of the cockpit 10 of the aircraft 1, such as for example a primary flight display (PFD).

According to one embodiment of the invention, the controller device 100 is further configured to determine a third piece of information, regarding whether the landing gear is in a non-retractable configuration, for example because of an obstacle of technical origin. The landing gear may thus be considered to be non-retractable because of detection of a fault or of an incident that occurred during lift-off. In this case, the controller device 100 inhibits the trigger of a retraction alarm or interrupts a retraction alarm that has already been triggered and that is operative. Such an incident may, for example, be detected on the basis of a so-called N1 indicator of the thrust of one or more engines of the aircraft 1. Thus, for example, in case of a bird strike on lift-off liable to cause a problem of a nature such that a prompt landing must be envisioned (for example, a significant loss of engine thrust), a retraction alarm is not triggered in case of omission. Specifically, in such a case, it is considered preferable to not influence the behavior of the flight crew in the conduct of procedures and especially to not interrupt a procedure in the process of being executed, and that is different from the landing-gear-retraction procedure.

Other events may occur, of a nature to prefer keeping the landing gear in deployed position. Apart from a landing-gear-retraction fault, an insufficient or negative climb rate may, for example, be observed during the initial part of the lift-off. According to another example, a braking-system problem may exist or occur on the runway and lead to a temperature that is so abnormally high, or even so very excessive, that there may be a risk of ignition of a fire and that it is then preferable to keep the landing gear deployed, especially for the purposes of cooling the one or more elements having an excessive temperature. Once again, in case of omission of execution of the standard retraction procedure, no retraction alarm is triggered by the controller device 100 of the piloting-assisting system 400.

According to one embodiment, the first landing-gear-retraction alarm taking the form of an audio or visual message in the initial part of the lift-off is triggered only when the flight performance of the aircraft 1 is degraded, because of the additional drag induced by the landing gear, in the absence of other problems. An overconsumption of fuel is however to be considered to be a degradation of performance stemming from the additional drag induced by the landing gear kept deployed, because of an omission of the standard retraction procedure.

According to one embodiment, the controller device 100 is configured to trigger a visual and/or audio alarm inviting a flight crew to keep the landing gear deployed, i.e., an alarm different from the first landing-gear-retraction alarm. This alarm may be rendered for example via an indicator light, via writing on a rendering device of an avionic module of the instrument panel 11, or of any piece of equipment of the cockpit 10, via a modification of the ambient lighting of the cockpit, via a variation in the color of a back-light of a device, or even via an audio signal or a message rendered in the form of a synthesized voice.

According to one embodiment of the invention, in the case where a first retraction alarm is triggered by the controller device 100 and occurs during the initial part of the lift-off, the message emitted or displayed is different from the predetermined message defined in the standard retraction procedure. The message may then be an equivalent translated into a specific language, or even any other message of nature to invite the flight crew to note the omission of the execution of the standard landing-gear-retraction procedure, and to accordingly effect a retraction of the landing gear of the aircraft 1, where appropriate.

According to one embodiment, when the aircraft is in a flight phase following the first part of the lift-off, i.e., when the first part of the lift-off has ended, a new (second) audio and/or visual retraction alarm may be triggered. Once again, this new (second) retraction alarm may take any form different from or identical to that of another predefined alarm, and may be rendered, for example, via an indicator light, via writing on a rendering device of an avionic module of the instrument panel 11, or of any piece of equipment of the cockpit 10, via a modification of the ambient lighting of the cockpit, via a variation in the color of a back-light of a device, or even via an audio signal or a message rendered in the form of a synthesized voice. According to one example, a second landing-gear-retraction alarm taking the form of a synthesized voice renders a message different from the emitted or displayed message corresponding to the first landing-gear-retraction alarm. Specifically, in a flight phase subsequent to the initial part of the lift-off, it is possible for the observed climb rate to not be positive and for the aircraft to be flying under the conditions of level flight or even of descent.

According to one embodiment, and whatever the flight phase in question, a landing-gear-retraction alarm is raised only once in an initial part of the lift-off or in a flight phase following the initial part of lift-off.

According to one variant, a landing-gear-retraction alarm may be repeated in the form of a synthesized-voice message or in another form, depending on the flight phase in the process of being executed. Advantageously, when an alarm is repeated in the absence of retraction of the landing gear by the flight crew of the aircraft 1, an intermediate delay is defined between two retraction alarms so as not to consequently increase the workload on the flight crew. Following similar reasoning, the duration of a retraction alarm is defined so that it is not emitted or displayed for too long. For example, the duration of a retraction alarm is predefined such as to be emitted or displayed for 5 seconds, or 10 seconds. According to one embodiment of the invention, the duration of emission or display of a retraction alarm depends on the number of times such an alarm has been triggered and emitted or displayed since the last lift-off or from the turn on of the engines of the aircraft.

According to variants of the aforementioned embodiments, the retraction of the landing gear of the aircraft 1 may be controlled via a control interface other than the landing-gear-retraction control lever 13 placed on the instrument panel 11. For example, a push-button, or even a command via a context menu of a touchscreen, may be used. These examples are non-limiting.

Figure 2:
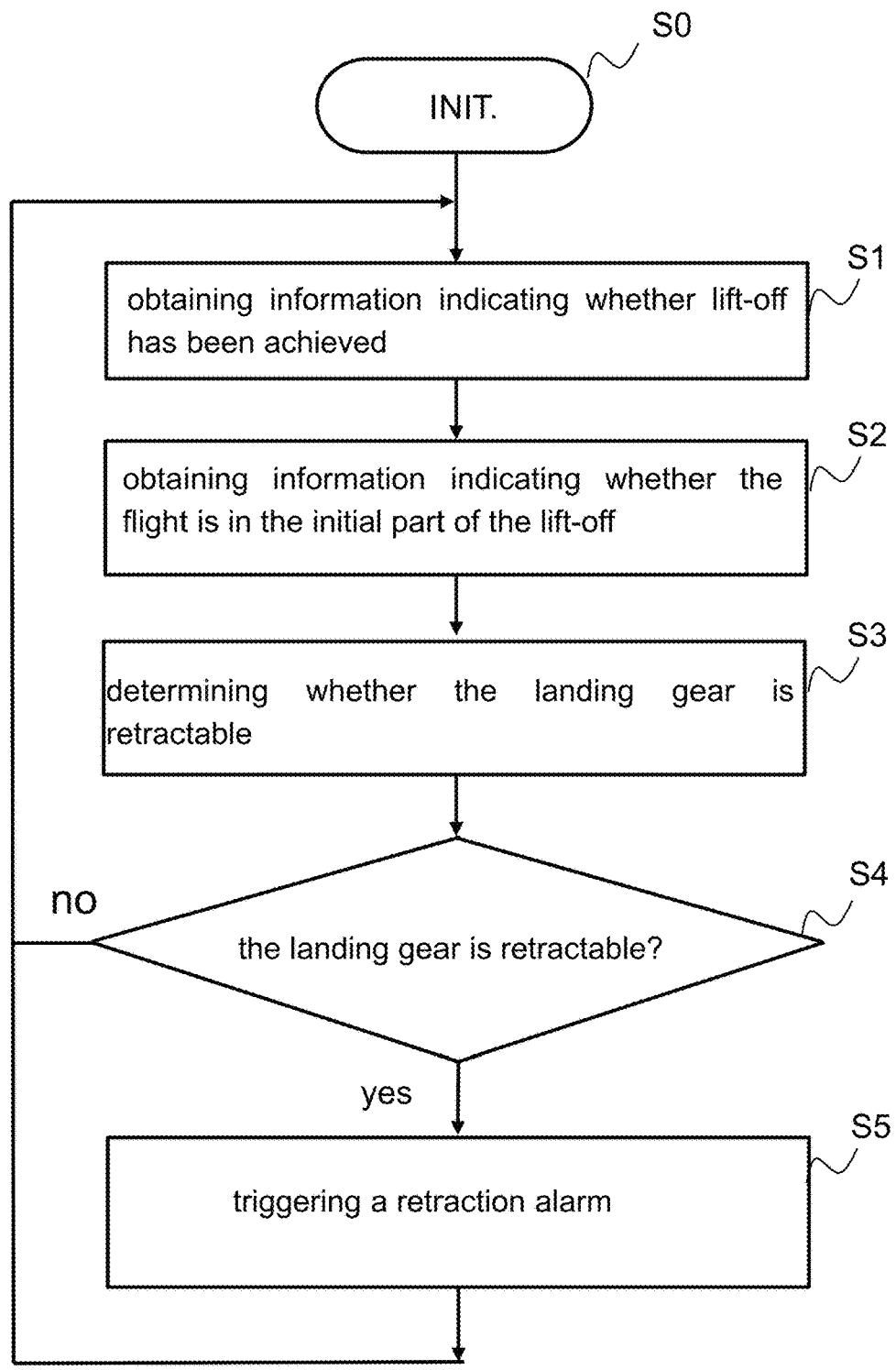
FIG. 2 is a flowchart illustrating a piloting-assisting method according to one embodiment, executed in a controller device of an aircraft.

FIG. 2 illustrates a piloting-assisting method according to one embodiment, executed by the controller device 100 of the piloting-assisting system 400 of the aircraft 1 according to one embodiment.

An initial step S0 corresponds to a nominal configuration of the aircraft 1 in use, in a phase prior to lift-off, for example when the aircraft 1 is aligned on a runway and has had permission to take-off granted by an air-traffic-control authority and when a take-off is initiated by increasing the power of the engines with a view to performing a ground roll over runway until at least the speed of rotation of the aircraft 1 is reached. In a step S1, the controller device 100 of the piloting-assisting system 400 obtains a first piece of information regarding whether lift-off has been achieved, on the basis of one or more signals, and/or of one or more avionic data, and for example a signal representative of a positive climb rate that is sufficient to allow an initial phase of lift-off to occur sufficiently safely. According to another example, the fact that lift-off has been achieved may be determined on the basis of a piece of information delivered by an altimeter that measures a variation in atmospheric pressure with respect to the atmospheric pressure measured on the ground or at a reference point, such as, for example, at sea level. In a step S2, the controller device 100 obtains a second piece of information regarding whether the flight is or is not in an initial part of the lift-off. This second piece of information is also obtained on the basis of one or more signals, and/or of one or more avionic data. For example, this second piece of information is obtained on the basis of a signal representative of altitude, of a signal representative of the position of the flaps, of a signal representative of air speed or even of a combination of signals allowing flight conditions corresponding to the initial part of the lift-off, i.e., the part such as defined above, to be deduced. It will be noted that the initial part of the lift-off may be defined differently for each of the flights performed by the aircraft 1, or even identically for each and every flight. For example, the initial part of the lift-off may be defined as the part between lift-off in the strict sense of the term and achievement of a predefined altimetric level. According to another example, the initial part of the lift-off may be defined as the part between lift-off in the strict sense of the term and a reconfiguration of the flaps. These examples are non-limiting and the aforementioned first and second pieces of information may each be determined on the basis of many flight or configuration conditions of the aircraft 1, such as described in the part of the description that made reference to FIG. 1.

In a step S3, it is then determined by the controller device 100 of the piloting-assisting system 400, whether the landing gear of the aircraft 1 is retractable. Thus, for example, the landing gear of the aircraft 1 is not retractable if it has already been retracted. According to another example, the landing gear is not retractable if it is considered so because of one or more pieces of information indicating that it is preferable to keep the landing gear in deployed position at this stage of the lift-off or of the flight of the aircraft 1. For example, if a fault is observed, and is of a nature to warrant prompt landing, the landing gear may be considered to be non-retractable by the controller device 100. The information regarding whether the landing gear is retractable is then compared, in a step S4, so as to make dependent thereon the trigger of a landing-gear-retraction alarm, if the landing gear has not yet been retracted by the flight crew of the aircraft 1. Thus, if the landing gear is not retractable, no retraction alarm is triggered and the method is set to wait for a new lift-off (the method returns to step S1 of detecting a lift-off). The new lift-off may then be a lift-off occurring after the aircraft has been newly turned on, or even to a lift-off in the context of a so-called touch-and-go procedure in which a landing procedure is immediately followed by a lift-off procedure, this possibly occurring in the case of a training fight or during a go-around when the plane lands initiated because of difficult conditions. According to one embodiment, if it is detected in step S4 that the landing gear is retractable, a retraction alarm is triggered in step S5, potentially depending on the second piece of information indicating whether the current flight phase is or is not in the initial part of the lift-off. If step S2 of the method is executed without delay after the detection of a lift-off in step S1, and in the absence of any faults, the current lift-off phase is the initial phase of lift-off and the controller device 100 then triggers, in step S5, a first landing-gear-retraction alarm taking the form of a message conveyed via a synthesized voice or reproduced speech, similarly to the announcement defined for the standard retraction procedure, and that is therefore expected in the initial phase of the lift-off in the presence of a climb rate meeting the conditions of safety, or taking the form of writing displayed to the flight crew.

Figure 3:
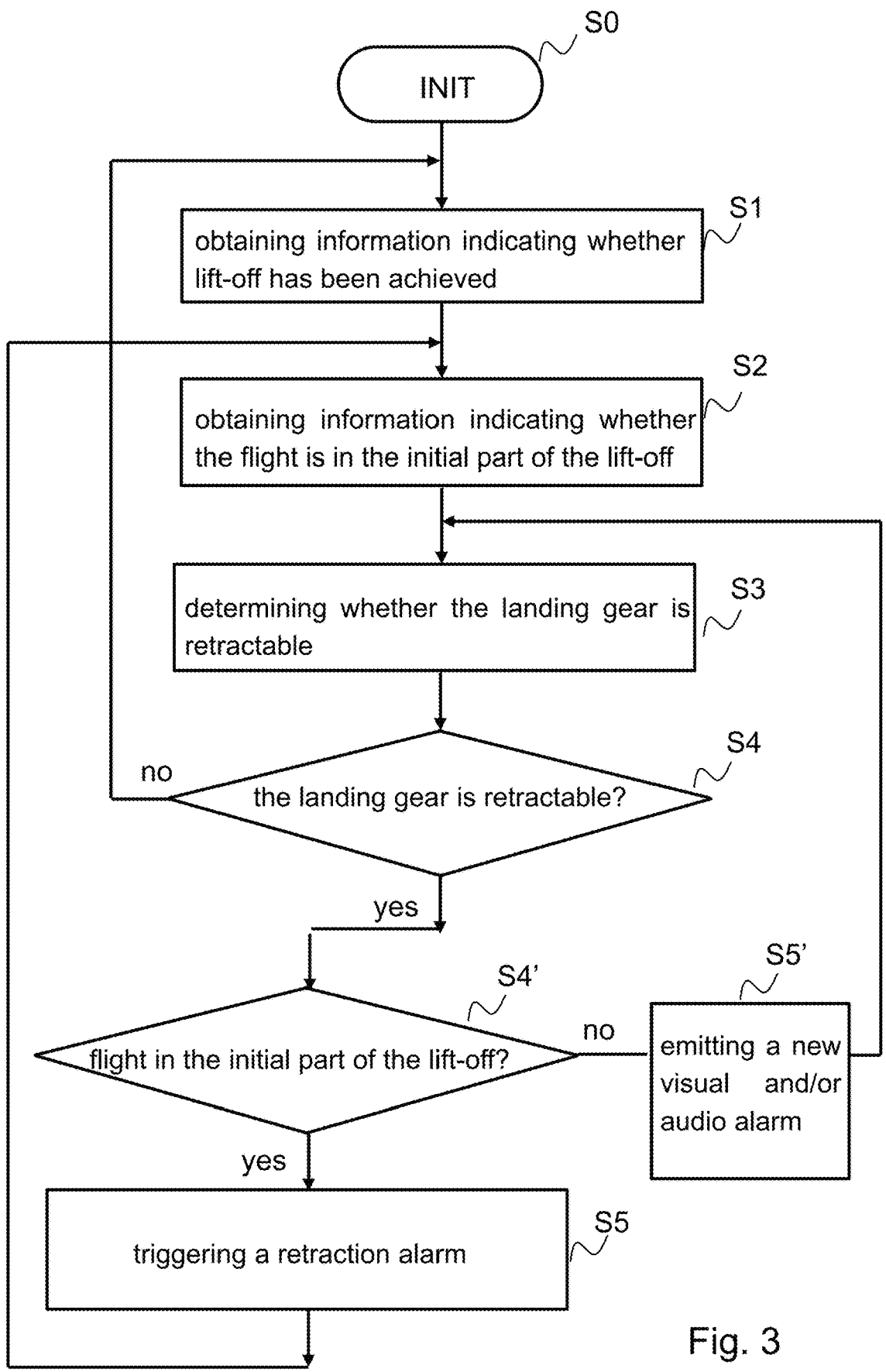
FIG. 3 is a flowchart illustrating a variant of the piloting-assisting method shown in FIG. 2, executed in a controller device of an aircraft.

FIG. 3 illustrates one variant of the piloting-assisting method executed in the controller device 100 of the piloting-assisting system 400 of the aircraft 1. According to this variant, a different alarm is emitted depending on whether the aircraft 1 is executing a flight phase in the initial part of the lift-off or is executing a flight phase subsequent to the initial part of the lift-off. Furthermore, and according to this variant, a new retraction alarm may be triggered in case of absence of retraction of the landing gear of the aircraft, and this new retraction alarm may be a message either taking visual form or taking the form of a synthesized voice, for example reproducing the terms "positive climb" if the aircraft 1 is still in the initial part of the lift-off, or possibly another alarm if the aircraft is in a flight phase coming after the initial part of the lift-off. A new alarm may therefore be a visual and/or audio alarm that may convey a different message to the first landing-gear-retraction alarm. Thus, according to this variant, steps S0, S1, S2 and S3 and S4 are identical to those described above in the portion of the description given with reference to FIG. 2 but a step S4' is introduced after the step S4 defining the operations carried out to determine whether the landing gear is retractable or not. In this step S4' it is decided, depending on whether the flight is or is not in the initial part of the lift-off, to trigger either a first retraction alarm in a step S5 similar to step S5 described with reference to FIG. 2, or to trigger the emission of a new (second) visual and/or audio alarm, in a step S5', respectively.

In the example of a method described in FIG. 3, the method loops back to step S2, after step S5, so as to update the piece of information indicating whether the flight is or is not in the initial part of the lift-off, with a view to potentially emitting a new retraction alarm, if the landing gear has still not been retracted. The method illustrated in FIG. 3 loops back to step S3 when a step S5' is executed, since, in such a situation, the flight is no longer in the initial part of the lift-off. A new retraction alarm, which takes a visual and/or audio form, and which is possibly different from the alarm specific to the initial part of the lift-off, may therefore be triggered.

Figure 4:
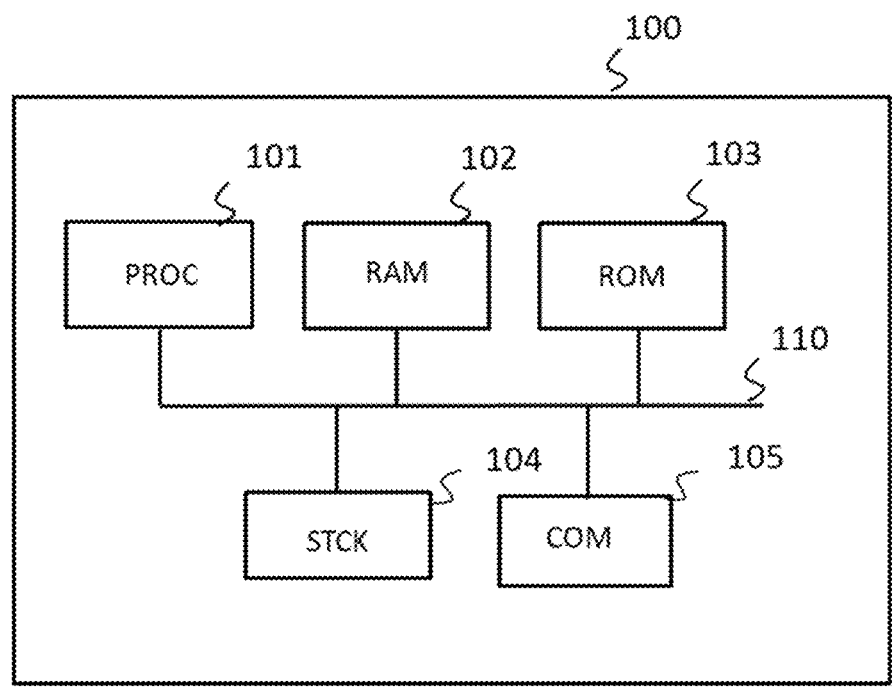
FIG. 4 is a diagram illustrating an architecture of a controller device configured to execute a piloting-assisting method such as, for example, the methods illustrated in FIG. 2 and FIG. 3; and, FIG. 5 illustrates an aircraft comprising the cockpit shown in FIG. 1, and comprising a piloting-assisting system provided with a controller device configured to execute a method such as illustrated in FIG. 2 and FIG. 3.

FIG. 4 schematically shows an architecture of the controller device 100 configured to execute a piloting-assisting method such as, for example, the methods illustrated in FIG. 2 and FIG. 3.

It will be considered by way of illustration that FIG. 4 illustrates an internal layout of the controller 100. It will be noted that FIG. 4 could also schematically illustrate an example of a hardware architecture of an avionic system useful for controlling the flight of the aircraft 1, or any other computing, display, rendering, control or monitoring function useful on board an aircraft 1, such as the piloting-assisting system 400.

According to the example of a hardware architecture shown in FIG. 4, the controller device 100 then comprises the following, connected by a communication bus 110: a processor or CPU ("central processing unit") 101; a random-access memory RAM 102; a read-only memory ROM 103; a storage unit such as a hard drive (or a storage medium reader, such as an SD ("Secure Digital") card reader) 104; at least one communication interface 105 furthermore offering input/output port interfaces, in particular so as to receive and transmit simple or composite signals and allowing the controller device 100 to communicate with avionic systems and devices present in the aircraft 1, such as, for example: an altimeter; a variometer; sensors of position of the landing gear, of the flaps, of the leading-edge slats; dedicated avionic computers; the retraction-control lever 13; a voice-synthesizing device configured to render messages via the audio rendering devices 15 and 15'; and a device configured to render messages via the visual rendering devices 16, these being non-limiting examples.

The processor 101 is capable of executing instructions loaded into the RAM 102 from the ROM 103, from an external memory (not shown), from a storage medium (such as an SD card), or attached to a communication network. When the controller device 100 is turned on, the processor 101 is capable of reading instructions from the RAM 102 and of executing them. These instructions form a computer program that causes the processor 101 to implement part of a method described with reference to FIG. 2 or FIG. 3 or of a method derived therefrom.

All of part of the method implemented by the controller device 100 or its variants may be implemented in software form through the execution of a set of instructions by a programmable machine, for example a digital signal processor (DSP) or a microcontroller, or may be implemented in hardware form by a machine or a dedicated component, for example a field-programmable gate array (FPGA) or an application-specific integrated circuit (ASIC). In general, the controller device 100 comprises electronic circuitry configured to implement the method described in relation thereto, by itself and with other avionic devices. Of course, the controller device 100 further comprises all of the elements that are usually present in a system comprising a control unit and its peripherals, such as a power-supply circuit, a power-supply-monitoring circuit, one or more clock circuits, a reset circuit, input/output ports, interrupt inputs, bus drivers, digital-to-analogue and analogue-to-digital converters, ideally fast ones. This list is non-exhaustive.

Figure 5:
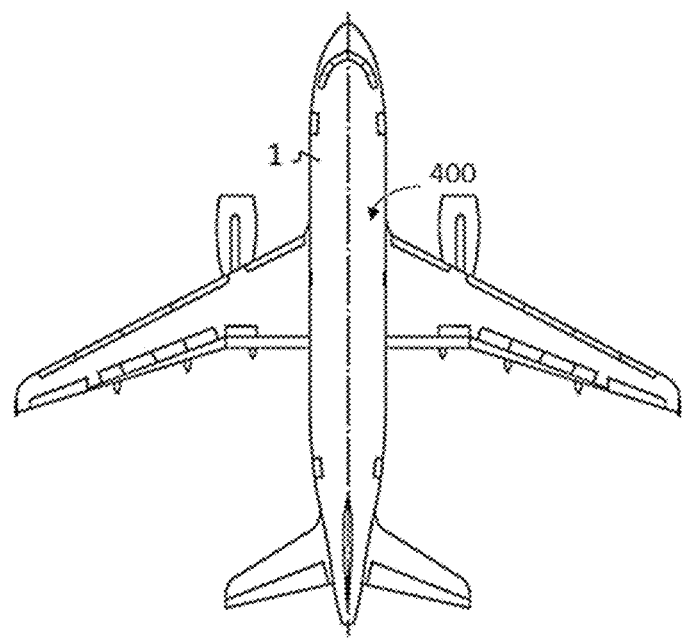

FIG. 5 shows the aircraft 1 comprising the cockpit 10, which is also shown in FIG. 1, and comprising the piloting-assisting system 400, which comprises the controller device 100 configured to execute a piloting-assisting method such as described above. The piloting-assisting system 400 is a dedicated avionic system configured to deliver information to a flight crew of the aircraft 1, alarms for example. According to one embodiment of the invention, the piloting-assisting system 400 is a flight warning computer (FWC) dedicated to the generation of visual and audio alarm messages the aim of which is to decrease the workload on a flight crew, in particular during lift-off and landing phases.

The invention is not limited to the described embodiments and examples but more generally relates to any system for assisting with piloting an aircraft equipped with a retractable landing gear, comprising a controller device configured to obtain a first piece of information indicating whether the aircraft has achieved lift-off, to obtain a second piece of information indicating whether the aircraft is in a flight phase in an initial part of lift-off or in a flight phase subsequent to an initial part of the lift-off, to determine, on the basis of at least the first piece of information, that the landing gear is retractable, and, if the landing gear is retractable, in the initial part of lift-off, to trigger a first landing-gear-retraction alarm taking a visual and/or audio form, optionally followed by one or more new retraction alarms, which will potentially be different from the first alarm.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for assisting with piloting an aircraft equipped with a retractable landing gear, said system comprising a controller device configured to:
   obtain a first piece of information regarding whether the aircraft has achieved lift-off,
   obtain a second piece of information regarding whether the aircraft is in a flight phase in an initial part of lift-off,
   determine, based on at least the first piece of information, whether the landing gear is retractable, if the landing gear is retractable in the initial part of lift-off, triggering a first landing-gear-retraction alarm taking an audio form and/or a visual form, and, if the landing gear is retractable after said initial part of the lift-off, triggering a second landing-gear-retraction alarm taking an audio form and/or a visual form, the second landing-gear-retraction alarm being different from the first landing-gear-retraction alarm.

2. The piloting-assisting system according to claim 1, wherein each of the first and second pieces of information is determined based on at least one or based on a plurality of pieces of information representative of conditions from the following list:
   a predefined position of a lever for controlling retraction of the landing gear,
   a predefined position of the landing gear,
   a climb rate higher than a predefined climb-rate threshold value,
   a climb rate higher than a predefined climb-rate threshold value for a predetermined climb time,
   an air speed higher than a predefined air-speed threshold value,
   a flight phase for a minimum predefined flight time,
   an altitude or a flight level higher than a predefined altitude or flight-level value,
   a variation in a reference speed of an engine greater than a predefined threshold value in a course of a predetermined period,
   a presence of a condition indicating that a lowered position of the landing gear is preferable,
   a position of leading-edge slats,
   a position of flaps,
   a determination of one flight phase among a plurality of predefined flight phases,
   an exceedance of a maximum flight speed in flight configuration with a landing gear deployed.

3. The piloting-assisting system according to claim 1, wherein the controller device is further configured to determine a third piece of information regarding whether the landing gear is in a non-retractable configuration, and is configured to inhibit a trigger of a retraction alarm or to interrupt a retraction alarm that is operative.

4. The piloting-assisting system according to claim 3, wherein the third piece of information is determined based on at least one or based on of a plurality of pieces of information representative of conditions from the list:
   a landing-gear-retraction fault has occurred,
   a negative or insufficient climb rate is determined during an initial part of the lift-off,
   an element of the landing gear has an excessive temperature.

5. The piloting-assisting system according to claim 3, wherein the controller device is configured to trigger an alarm inviting a flight crew to keep the landing gear deployed.

6. The piloting-assisting system according to claim 1, wherein the controller device is configured, if the landing gear is retractable in the initial part of lift-off, after a first predetermined delay starting from a trigger of the first landing-gear-retraction alarm, to trigger the first landing-gear-retraction alarm again.

7. The piloting-assisting system according to claim 1, wherein the controller device is configured, if the landing gear is retractable after an initial part of the lift-off, after a second predetermined delay starting from a trigger of the second landing-gear-retraction alarm, to trigger the second landing-gear-retraction alarm again.

8. An aircraft comprising a piloting-assisting system according to claim 1.

9. A method for assisting with piloting an aircraft equipped with a retractable landing gear, the method being executed in a controller of an aircraft system of said aircraft, the method comprising:
   obtaining a first piece of information regarding whether the aircraft has achieved lift-off,
   obtaining a second piece of information regarding whether the aircraft is in a flight phase in an initial part of lift-off,
   determining, based on at least the first piece of information, whether the landing gear is retractable,
   if the landing gear is retractable in the initial part of lift-off, triggering a first landing-gear-retraction alarm taking at least one of an audio form or a visual form, and,
   if the landing gear is retractable after said initial part of the lift-off, triggering a second landing-gear-retraction alarm taking an audio form and/or a visual form, the second landing-gear-retraction alarm being different from the first landing-gear-retraction alarm.

10. The method for assisting with piloting an aircraft according to claim 9, further comprising:
    determining a third piece of information indicating whether the landing gear is in a non-retractable configuration, and
    inhibiting the trigger of the retraction alarm or interrupting the retraction alarm in progress.

11. The method for assisting with piloting an aircraft according to claim 10, further comprising:
    triggering an alarm inviting a flight crew to keep the landing gear deployed.

12. The method for assisting with piloting an aircraft according to claim 9, further comprising:
    if the landing gear is retractable in the initial part of lift-off, after a first predetermined delay starting from the trigger of the first landing-gear-retraction alarm, triggering the first landing-gear-retraction alarm again.

13. The method for assisting with piloting an aircraft according to claim 9, further comprising:
    if the landing gear is retractable after said initial part of the lift-off, after a second predetermined delay starting from the trigger of the second landing-gear-retraction alarm, triggering the second landing-gear-retraction alarm again.

* * * * *